United States Patent [19]

Stephenson et al.

[11] Patent Number: 5,475,460
[45] Date of Patent: Dec. 12, 1995

[54] PHOTOGRAPHIC PLAY SET HAVING IMPROVED LIGHTING

[75] Inventors: Stanley W. Stephenson, Spencerport; Paul L. Ruben, Penfield, both of N.Y.

[73] Assignee: Eastman Kodak Company, Rochester, N.Y.

[21] Appl. No.: 220,321

[22] Filed: Mar. 30, 1994

[51] Int. Cl.⁶ .......................... G03B 15/06; G03B 15/05
[52] U.S. Cl. ................ 354/290; 354/81; 354/132; 354/145.1; 354/149.11; 354/291; 354/292
[58] Field of Search ........................ 354/80, 81, 132, 354/145.1, 149.1, 149.11, 290, 291, 292, 293, 295; 352/88, 89

[56] References Cited

U.S. PATENT DOCUMENTS

| | | | |
|---|---|---|---|
| 596,312 | 12/1897 | Badgley. | |
| 624,111 | 5/1899 | Snow | 354/291 |
| 2,403,892 | 7/1946 | McFarlane et al. | 355/21 |
| 2,590,916 | 4/1952 | Back | 354/126 |
| 3,195,431 | 7/1965 | Augustin et al. | 354/126 |
| 3,495,516 | 2/1970 | Henderson | 354/126 |
| 3,514,206 | 5/1970 | Harvey et al. | 354/126 |
| 3,601,652 | 8/1971 | Burnett | 315/156 |
| 3,687,030 | 8/1972 | Dine | 354/293 |
| 3,709,119 | 1/1973 | Van Der Meer | 354/81 |
| 3,836,927 | 9/1974 | Dine et al. | 354/80 |
| 4,114,167 | 9/1978 | McKee | 354/81 |
| 4,498,748 | 2/1985 | Jones et al. | 354/79 |
| 4,701,039 | 10/1987 | Johnson | 354/80 |
| 4,740,805 | 4/1988 | Germond | 354/291 |
| 4,755,838 | 7/1988 | Lemmey | 354/80 |
| 5,289,220 | 2/1994 | Fidler | 354/295 |
| 5,337,104 | 8/1994 | Smith et al. | 354/149.11 |
| 5,389,993 | 2/1995 | Adolphi et al. | 354/291 |

Primary Examiner—A. A. Mathews
Attorney, Agent, or Firm—Joseph F. Breimayer

[57] ABSTRACT

A play set for children that allows a child to take correctly framed, focused and illuminated photographs of dolls, action figures or the like, in a life-like play setting. A camera support frame receives a removable, standard camera and aims its lens, through a close-up diopter lens attached to the frame, at the play setting in proper focus. The play setting includes a wall support for a changeable backdrop and a stage for positioning the dolls or figures in front of the chosen backdrop. The frame for the camera is spaced a fixed distance from the wall and stage to set a depth of field to encompass the backdrop and the dolls and figures in the stage area. Illumination of the stage area including the dolls and figures and the backdrop is provided in several alternative ways. Glare off the backdrop and figures resulting if the camera's simple flash unit is used to directly illuminate the play setting is reduced by configuring the camera supporting frame to tilt the camera relative to the backdrop. In another embodiment, reflective baffles supported by the frame redirect the light onto the play setting at an improved angle relative to the lens taking axis. In a preferred embodiment, the camera's flash is blocked by a frame supported baffle, and a sensor supported by the frame is operative on its firing to trigger a more optimally positioned remote flash unit to fire. The camera is removable and usable by the child in the normal fashion.

25 Claims, 6 Drawing Sheets

PHOTOGRAPHIC PLAY SET HAVING IMPROVED LIGHTING

FIELD OF THE INVENTION

The present invention relates to the field of close-up photography and more particularly to a child's photographic play set for close-up photography of dolls or action figures with proper focus and flash illumination.

BACKGROUND OF THE INVENTION

It is well known in the field of photography to provide a stand or fixture for holding a camera and/or the subject to be photographed so as to maintain the two in a relationship suitable for making close-up photographs. It is also known from commonly assigned U.S. Pat. No. 3,514,206 to provide such a fixture with an auxiliary lens to assist in focusing the camera on the subject and a baffle and diffuse surface to attenuate and reflect the flashcube illumination of the camera employed onto the subject area. In the '206 patent, the fixture is a copy stand for photographing documents laid flat on a horizontal surface. Other fixtures for photographing horizontal documents, photographic prints, small objects, and the like, are disclosed, for example, in U.S. Pat. Nos. 2,403,892, 2,590,916, 3,709,119 and 4,701,039.

A variety of other close-up camera attachments for various diverse applications, including medical, passport, dental, journalistic, law enforcement, naturalistic and scientific applications, are known: e.g. those disclosed in U.S. Pat. Nos. 3,195,431, 3,687,030, 3,836,927, and 4,755,838. Typically, these attachments are mounted to the camera, and the camera is held by the photographer in relation to the subject to be photographed.

In the fields of architecture and construction, photographic fixtures are employed to photograph model buildings and room arrangements at various angles, as disclosed, for example, in U.S. Pat. Nos. 3,495,516, 4,114,167, and 4,498,748.

Children also enjoy using simple cameras to take pictures of various scenes. The cameras for children typically have a fixed focus range of between infinity and about five feet, since children have difficulty judging distance and setting proper focus of adjustable focus cameras. The close-up distance of five feet is too long to allow the children to create close-up pictures with maximum desirable detail, but children are not always aware of this. Children often take out of focus and mis-aligned photographs when they attempt to take pictures in these situations.

Such cameras also typically include simple, fixed output illumination, electronic flash units mounted on the camera close to the lens. The output illumination level is typically chosen for a distance to the subject in excess of the five foot focus limit. Consequently, flash pictures taken close to the subject also exhibit glare reflected from the subject and obscure subject details.

While auto-focus and auto-exposure features could be added to such cameras at additional cost, their proper functioning still has limitations which are particularly evident in close-up situations. Children, in any case, have difficulty holding the camera still and viewing through the viewfinder on the desired subject long enough to allow the auto-focus and auto-exposure features to function properly.

Children play with dolls and action figures and their accessories (i.e., playthings) that can be posed in a variety of configurations or settings. Typical children's play consists of arranging these figures and associated accessories into a variety of settings to act out various situations. Should the child (or adult for that matter) desire to take an image at a typical close-up distance of between two and four feet, the view-finder in the typical child's camera does not frame the scene correctly because of a separation in that range between the viewing and taking optics (referred to as parallax). At these close ranges, small changes in the position of the camera significantly changes the taking field when the camera is held by hand. In addition, children typically have problems framing scenes for good composition, resulting in poor quality photographs.

Problems to be Solved by the Invention

None of the prior art reflects the special needs of children in organizing and arranging subjects for taking pictures and controlling the operation of the camera and flash unit, particularly for close-up photography of their playthings.

SUMMARY OF THE INVENTION

It is therefore an object of the present invention to provide a child's play set for receiving a camera to allow close-up photography of playthings on a play stage in relation to a changeable backdrop scene at proper focus and flash illumination for the camera used.

It is a still further object of the present invention to provide a child's play set for receiving a camera to allow close-up photography of playthings on a play stage in relation to the backdrop scene at proper focus for the camera used and to provide illumination of the play stage and backdrop scene through an auxiliary flash unit triggered from the discharge of the camera flash unit.

These and other objects of the invention are realized in a children's play set incorporating a camera support frame having a shaped receptacle to hold a camera in a generally horizontal orientation above a horizontal surface, a close-up lens attached to the camera support frame in line with the camera taking lens, a base adapted to extend on the horizontal surface to define a stage for the placement of playthings to be photographed, and a backdrop frame extending upward from the base for receiving a selected one of several different back drop scenes against which the playthings may be selectively arranged to be photographed as a combined scene in focus by the camera through the close-up lens.

Improved illumination is effected in one case by providing first and second reflectors to diffusely disperse the camera's flash illumination onto the combined scene from above the camera receptacle.

In a further variation, the camera holding element is tilted in the receptacle relative to the backdrop to prevent high intensity flash light from reflecting from the backdrop back into the camera taking lens.

In one preferred embodiment, the camera receptacle is formed with a baffle to block the camera's flash illumination. The baffle includes a sensor for detecting the illumination of the camera flash unit and providing a trigger signal. The trigger signal is conducted to a secondary flash unit mounted to a flash stand that is positionable with respect to the base apart from the camera support frame and the backdrop frame sufficiently to provide illumination of the combined scene without reflecting light back to said camera taking lens.

Preferably the base is formed with positioning stations for fixedly positioning the camera support frame and the secondary flash unit stand (if present) at predetermined positions with respect to the stage and backdrop frame for maintaining proper focus, field of view, and illumination of the combined scene.
Advantageous Effects of the Invention The play set solves many of the problems that children have in composing and taking close-up pictures while allowing them to use their imaginations in selecting and positioning playthings with respect to backdrop scenes to provide a series of action photographs to depict their imagined stories. The resulting photographs are pleasing and satisfying, resulting in a sense of accomplishment. The cameras used in the play set are otherwise usable for general photography by the child.

BRIEF DESCRIPTION OF THE DRAWINGS

Other objects, advantages and features of the present invention will become apparent from the following specification when taken in conjunction with the accompanying drawings in which like elements are commonly enumerated and in which.

The figures are not necessarily drawn to scale.

DETAILED DESCRIPTION OF THE PREFERRED EMBODIMENTS OF THE INVENTION

In accordance with the invention, a child's photographic play set is disclosed for use with playthings that eliminates many of the problems associated with close-up photographs by children. The typical doll varies in height from between a few inches and several feet. The most popular dolls and action figures, e.g. the "Barbie" dolls manufactured by the Mattel Company, are typically 12 inches (30 cm) high and have a limb spread of about 5 inches (12.5 cm) wide. Using typical children's cameras that limit close-up photographs to 5 feet (1.5 m) or greater, the doll or action figures would fill less than 30 percent of the height of the resulting photograph. Such photographs have little detail. Moving closer to the subject enlarges the image, but the image is in poor focus and therefore that is not pleasing.

It is, therefore, advantageous to include a correcting lens in the play set so as to allow for more sharply focused images. Another option would be to set the lens at a close focus distance. Such a camera would capture focused close-up images, but be unable to capture images farther away than 10 feet (3.3 m), and would not be usable for general photography that the child would also be interested in.

Figure 1:
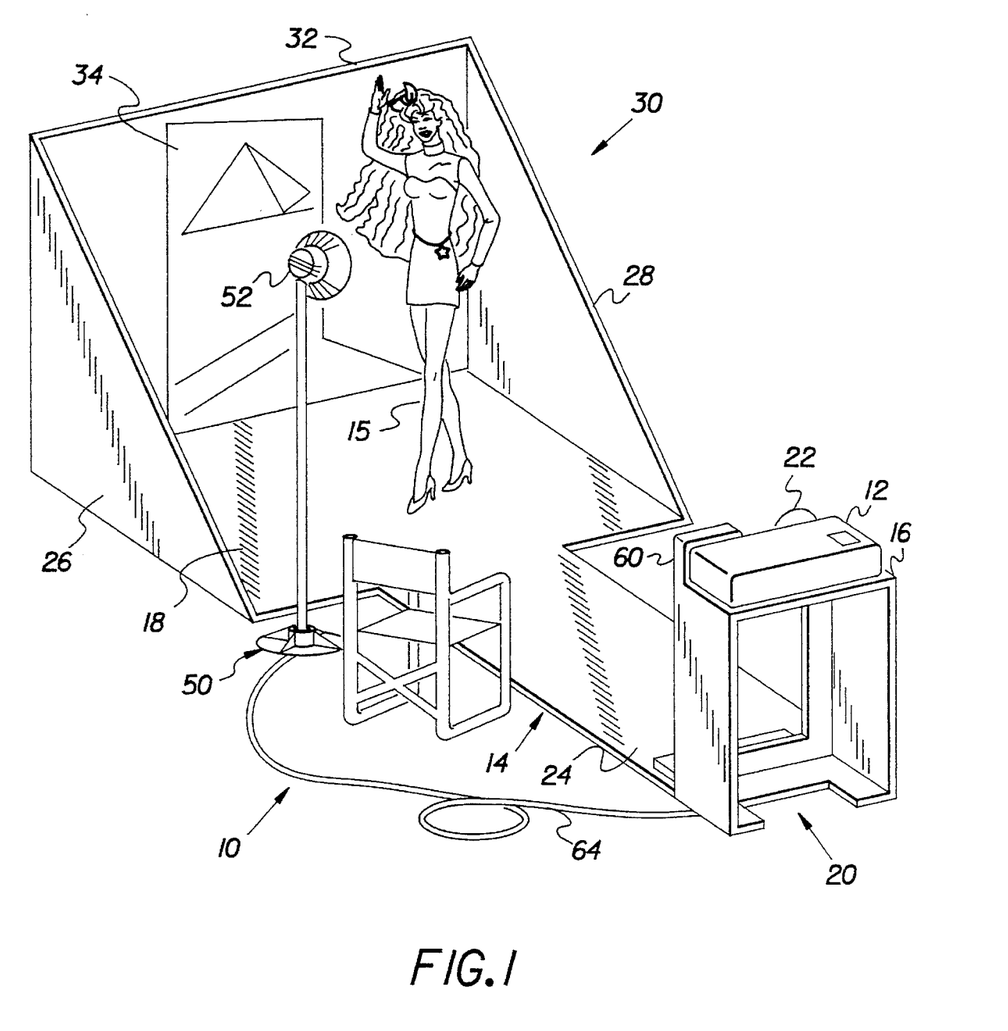
FIG. 1 is a perspective view of the major components of the play set of the present invention including a secondary flash unit employed in one illumination embodiment of the invention.

In the play set 10, as depicted in a first embodiment of the invention in the perspective view of FIG. 1, a camera 12 is positioned above a base 14 in a receptacle 16 formed on the top of a camera support frame 20 so that the camera taking lens is centrally aimed at a combined scene 30. The combined scene 30 includes the playthings in front of a generally rectangular backdrop frame 32 extending upward from a play area or stage 18 of the base 14 and constructed to receive and support a selected one of several different backdrop scene prints 34. The playthings, e.g. the "Barbie" doll 15 may be selectively posed on the stage or play area 18 to be photographed in focus with the backdrop scene print 34 by the camera 12.

The camera support frame 20 may take any convenient shape and serves the purpose of positioning the camera 10 in a generally horizontal orientation above a horizontal surface that the base 14 and camera support frame 20 rests upon. A close-up, diopter lens 22 is attached to the camera support frame 20 in line with the camera taking lens (obscured in this view). The close-up lens 22, used in combination with the camera taking lens, adjusts the focus and depth of field to match the play area or stage 18 and the field of view to match the horizontal and vertical dimensions of the backdrop scene print 34.

Figure 2:
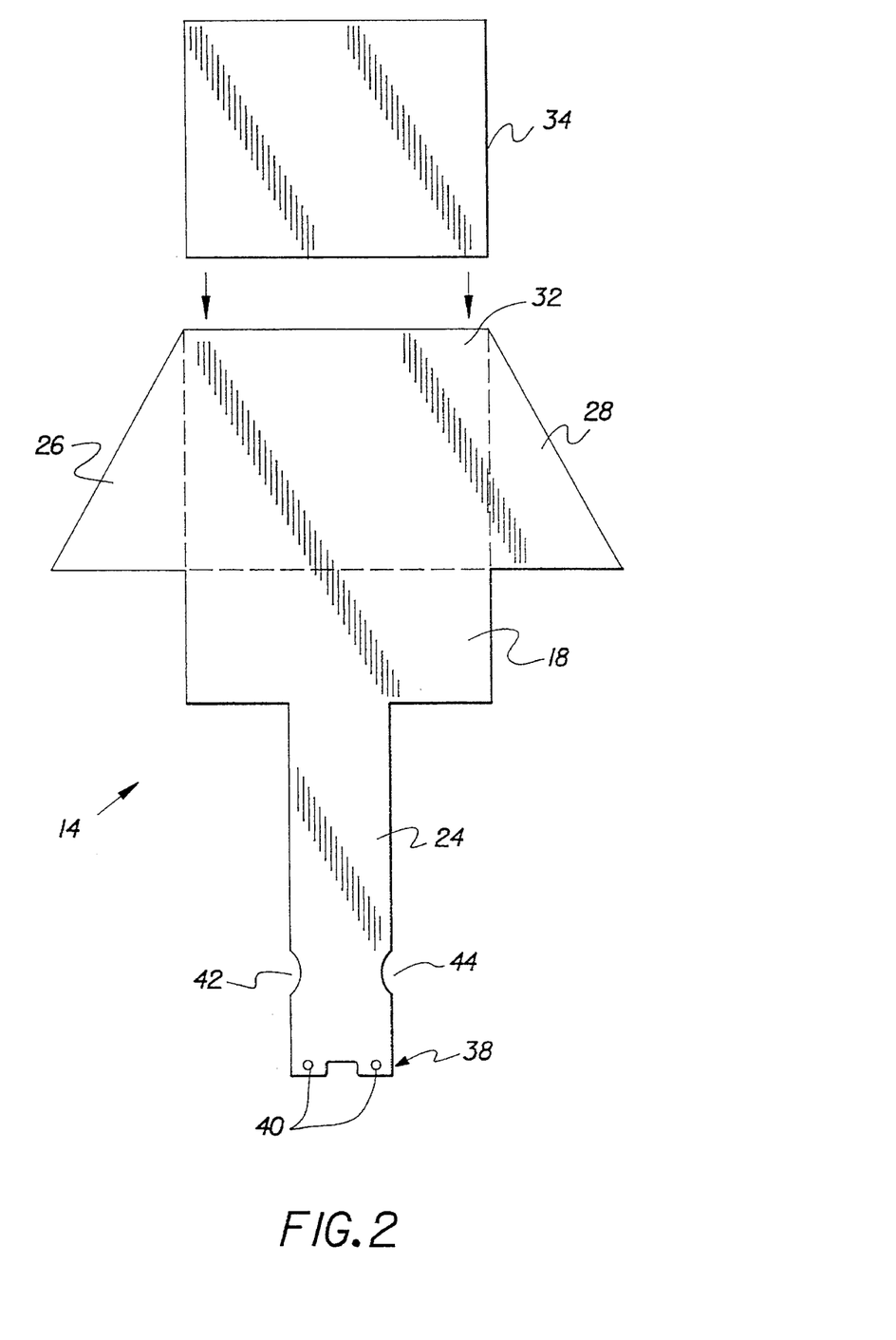
FIG. 2 is a top view of the base and scene frame flattened out to show the relative positioning of the components of the preferred embodiment.

The base 14 and backdrop frame 32 are preferably formed of stiff cardboard cut in a pattern 36 depicted as flattened out in FIG. 2. Pattern 36 includes the base runway 24 that extends on the horizontal surface away from the camera support frame 20 to the stage 18 as depicted in FIG. 1 and the backdrop frame 32 and right and left side supports 26 and 28 that are folded to extend vertically as depicted in FIG. 1. When the backdrop frame 32 and right angle side supports 26 and 28 are upright, the selected backdrop scene print 34, formed on stiff matte paper board, may be fit in and stand upright against the backdrop frame 32. Of course, the backdrop frame 32 may be a separate piece that stands upright with side guides, adhesive surfaces or the like to hold the backdrop print 34 in place.

Figure 3:
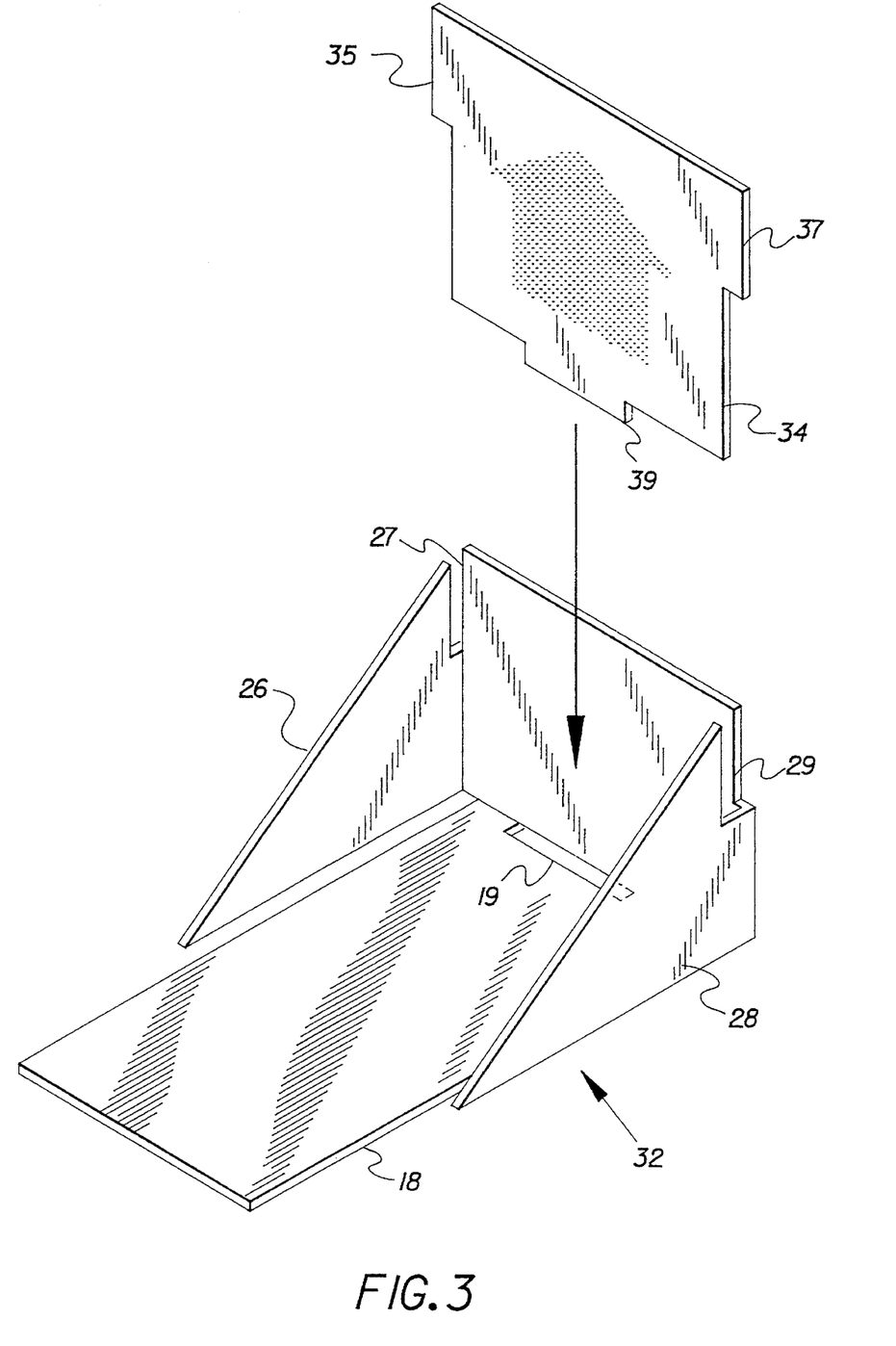
FIG. 3 is a perspective view of a further embodiment of the base and scene frame of FIGS. 1

FIG. 3 illustrates a further variation on the manner of providing a backdrop frame 32 and supporting the backdrop scene print 34. In this variation, the right angle side supports 26 and 28 have side slots 27 and 29 formed respectively therein, and a further base slot 19 is formed in the stage 18. The backdrop scene print 34 is formed with outward extending side tabs 35 and 37 and base tab 39 that are sized and shaped to fit the side and base slots. Preferably, the slots 27, 29 and 19 are wide enough to receive a stacked set of backdrop scene prints 34 that so that a selected print may be placed on top in the combined scene at any given time.

In a further variation, the backdrop frame 32 may be in the form of a picture frame with backdrop prints 34 fitted into the frame. Such backdrop prints 34 could be stored on a roll of successive prints supported on side rollers, so that the successive prints may be advanced successively or arbitrarily selected and positioned in the backdrop frame 32.

In any such embodiment, the play set allows for the child to create a variety of scenarios by having a plurality of backdrop scenes for posing and action scenarios. Optimum print selection matches the proportions and colors of the backdrop scenes to the color and size of the playthings. New tableaus can be constructed as further sets of backdrop prints 34 become available and are offered for use with the play set.

Returning to FIG. 2, the base runway 24 is formed with a "jig saw" cut out end 38 with a pair of holes 40 to match the footprint and posts in the camera support frame 20 in only one way. Further patterned receptacles 42 and 44 may be formed in the sides or in side extensions of the runway 24 to accommodate the footprint of secondary flash unit stand 50 also depicted in FIG. 1. Preferably, the receptacles 42, 44 would be patterned to only accept the footprints in one way which orients the flash illumination in the proper direction toward the combined scene.

Figure 4:
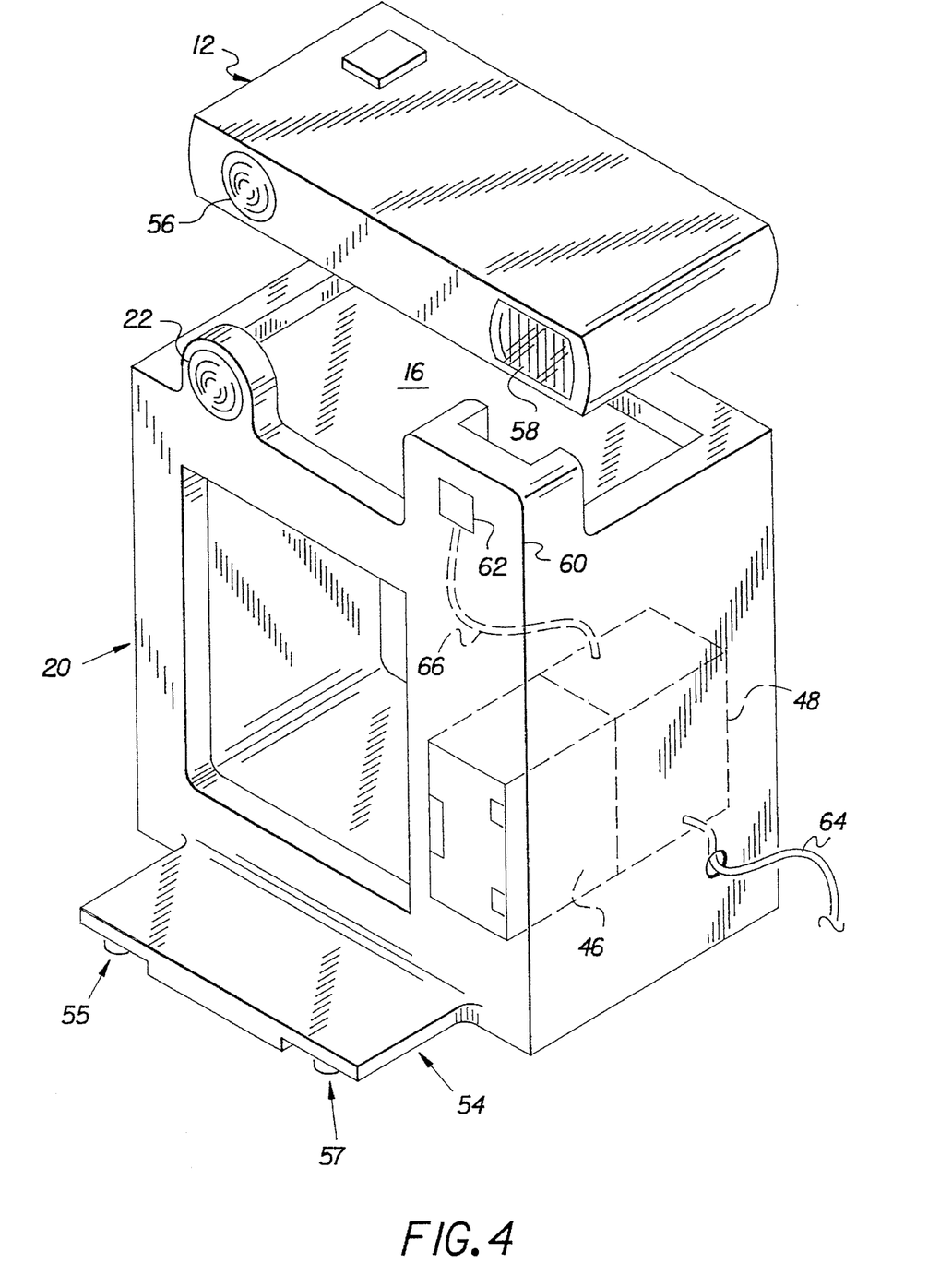
FIG. 4 is a front perspective view of the camera support frame of FIG. 1.

Turning to FIG. 4, it depicts the camera 12 in partial cut-away view in the receptacle 16 in the camera support frame 20. The receptacle 16 is patterned to fit the camera 12 and position it only one way in the receptacle 16. With the camera 12 positioned properly, the optical axis of the camera taking lens 56 is essentially coincident (i.e. aligned) with the optical axis of the close-up, diopter lens 22. The footprint 54 of the frame 20 patterned to be inserted with the runway cut out end 38 and pair of holes 40 is also depicted in this front view.

The camera 12 is preferably a conventional KODAK® Star® 110 camera with special graphics and colors to match the theme of the dolls or action figures that the play set is directed to. This 110 mm format camera has a taking lens 56 with a focal length of 28 mm and an f/8 aperture. The lens focus is set at 12 feet, which provides for blur free images at distances from infinity down to 5 feet. The 110 film format in the camera captures the scene in an image frame area of 13×17 millimeters.

In this play set embodiment, the doll FIG. 15 used for the scaling of the stage 18 and backdrop frame 32 is the commercial "Barbie" doll, that is about 12 inches (30 cm) tall. To capture this doll with a slight amount of overlap, the capture area for the backdrop scenes is sized at 14 inches (35 cm) high and 18 inches or 45 cm wide. To achieve a correct capture area or field of view, the camera taking lens 56 needs to be about 30 inches (75 cm) from the backdrop frame 32, which is effected by the length of the runway 24 and the depth of the stage 18. With the specified camera taking lens 56, correct focus of the combined scene is achieved using a +1.125 diopter (about 890 mm focal length) close-up lens 22.

The receptacle 16 is patterned to the 110 format camera, and the camera support frame 20 elevates the camera taking lens 56 to about 7 inches (17.5 cm). The taking lens 56 and close-up lens 22 are axially centered by the receptacle 16 midway between the sides of the backdrop scene. These dimensions also work for smaller scale action figures, although they can be scaled differently depending on the figure or plaything scale.

In this embodiment, the shape of the camera receptacle 16 matches the shape of the conventional body of the camera 12 to provide for the camera taking lens 56 alignment to the close-up lens 22. Of course, the invention may be practiced with other camera shapes, including single-use, re-cyclable, 35 mm format cameras.

In another embodiment, the camera body may be altered to a form that only fits one way, e.g. by forming a pair of sockets in the camera body. A receptacle may be formed with a pair of pins that engage the alignment sockets in the camera body in only one way.

It would be expected that the camera to be used with the play set would be provided with the play set as sold. However, differently shaped play set receptacles and close-up lenses may be provided to accommodate different camera sizes and shapes. With the proper receptacle and dimensions for the play set, correctly framed images can be insured, while the camera is still useful for general photography apart from the play set.

Figure 6:
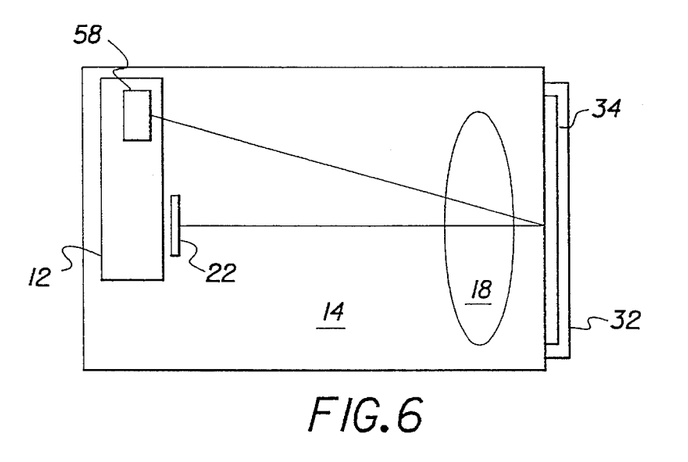
FIG. 6 is a simplified top view of the camera and play set of FIG. 5.

The preferred embodiments of the invention of FIGS. 1–4 have been described and directed particularly to conventional 110 format cameras. These cameras have a flat, horizontal structure, as shown in FIGS. 1 and 4, with the integral camera flash unit 58 disposed to one side of the taking lens 56, as shown in FIGS. 4 and 6. The flash unit 58 in such 110 format cameras is currently separated from the taking lens by 3 to 4 inches (about 7.5 to 10 cm).

Figure 5:
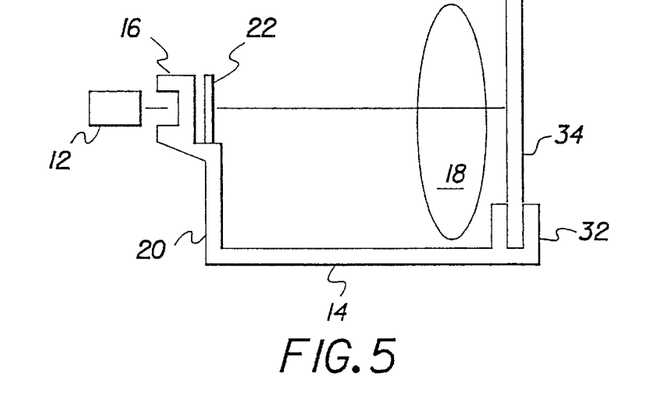
FIG. 5 is a simplified side schematic view of the arrangement of the camera with respect to the play set.

Such flash units are designed to provide sufficient flash illumination at a distance of about 10–12 feet (3.3–4.0 mm). This flash output can be is excessive for the distances of 30–36 inches (75–98 cm) of the play set described above, particularly given the right angle direction of the flash illumination, provided by the camera flash unit 58, to the backdrop prints 34 as shown in FIGS. 5 and 6. Excessively bright areas are caused by direct reflection of the flash light from the backdrop print 34 surface back to the close-up lens 22 and aligned camera taking lens 56 as shown in FIG. 6. In addition, the harsh flash illumination tends to be off center, creating dark shadows behind the posed figures or playthings that may be seen in the resulting photographs.

These highlights can be eliminated if the illumination strikes the backdrop print surface at an angle so that the light cannot be reflected from highly specular surfaces back into the close-up lens 22 and camera taking lens 56. Most current cameras have this problem when positioned as described because the camera flash unit is located relatively close to the taking lens in each case. This occurs due to constraints in the sizing of the body of the camera given that flash units positioned as far from the taking lens as possible are still considered "close".

Highlights are prevented when the angle of separation between the flash and taking lens axis is greater than 8.5 degrees. In the range of 30–36 inches (75–98 cm) between the taking lens and the combined scene in the play set of FIGS. 1–4, the angle of separation achieves a maximum value of 7.5 degrees, resulting in highlights.

The highlights can be eliminated if the taking lens axis and illuminating source axis are separated by more than 5 inches (7.5 cm). The optimum position of the flash unit or other light source would be centered on the scene, have a significant angle greater than 8.5 degrees between the illumination axis and the taking lens axis, and be diffused downward on the combined scene 30 from a large reflecting surface. The resulting images would have no highlights and minimal shadows. These considerations are addressed to a greater or lesser degree of optimization in several embodiments described as follows.

Returning to FIGS. 1 and 4, in a first illumination embodiment, the illumination output from camera flash unit 58 is blocked from illuminating the combined scene 30 but is employed to trigger illumination of the combined scene 30 by a secondary flash unit 52, shown in FIG. 1. A baffle or shroud 60 is supported by camera support frame 30 and positioned in front of the primary camera flash unit 58 to block its light output.

The secondary flash unit 52, FIG. 1, is supported on its stand 50 and is positioned in one of the receptacles 42, FIG. 2, so that the secondary flash unit 52 is aimed at the combined scene 30 from the side and above the camera taking lens 56. The secondary flash unit 52 is a miniaturized electronic flash unit with its own battery power supply or just the flash tube and lens as described below. The secondary flash unit 52 provides a relatively low level of illumination gauged to the distance to and area of the combined scene 30 so that the scene 30 is not washed out by its flash illumination.

In one preferred embodiment, the flash power batteries are located in the secondary flash unit battery compartment 46 adjacent to the secondary flash electronic charging circuit 48, both contained in the camera support frame 20, as shown in FIG. 4. The photo detector 62 in the baffle 60 is coupled internally by a photo detector cable 66 to the secondary flash electronic circuit 48 to trigger discharge of the charged output capacitor energy through the flash unit cable 64 leading to the flash bulb, which in this embodiment is located at the top of the secondary flash unit stand 50. Charging of the high voltage flash output capacitor would be initiated in the normal fashion by a manually actuatable switch (not shown) mounted in the camera support frame 20 when it is desired to take photographs using the play set. The switch could be closed by positioning the camera in the receptacle 16 and opened on removal of the camera. A flashing light or buzzer could also be included in the camera support frame 20 that would be lit or sounded when the flash unit high voltage capacitor is charged to either initiate the taking of the photograph or to remove the camera and open the manually or camera actuated switch.

In a further embodiment (not shown) the flash unit cable 64 may be directly connected to the photo detector cable 66 and extend to a separate housing for the batteries and secondary flash unit electronic charging circuit. In this embodiment, the separate housing may also be freestanding or integrally formed with the secondary flash unit stand 50.

Figure 7:
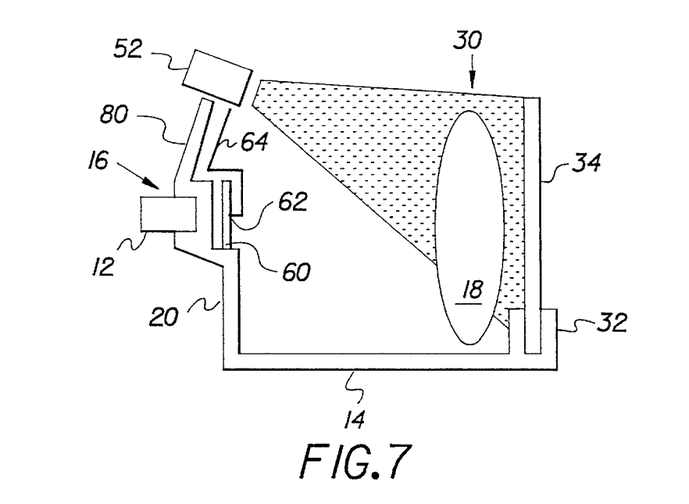
FIG. 7 is a simplified side schematic view of a first alternative embodiment of the illumination components of the invention.

Turning to FIG. 7, a further embodiment is schematically illustrated for locating the secondary flash unit 52 above the camera support frame 20 and angled downward to aim the flash illumination onto the combined scene 30. In this embodiment, the camera support frame 20 includes an integral secondary flash unit extension 80.

In these embodiments, it is necessary to synchronize triggering of the secondary flash illumination to the opening of the camera shutter when the user depresses the shutter release button. As shown in FIGS. 4 and 7, and described above, the photo detector 62 is mounted on the baffle 60 to detect the illumination from the camera flash unit 58 and provide a sync trigger signal to the secondary flash unit 52 through a cable 64.

Typically, shutter opening durations are on the order of 10 milliseconds, and flash units operate on the order of 2 microseconds. The delay between the firing of the camera flash unit 58 and the firing of the secondary flash unit 52 is short enough to prevent a problem with synchronized film exposure.

A second approach involves a modification of the simple 110 format camera to have a synchronized flash output jack. When a mating jack on a trigger cable extending to the secondary flash unit is inserted, the trigger signal is provided directly to the secondary flash unit 58, and the camera flash unit 52 is disabled from firing in a manner well known in the art.

However, it is preferable to avoid modifying the camera or providing such a jack in a child's camera where there could be a chance for a shock being delivered if something else is inserted into the jack. The use of the photo detector 62 eliminates the risk presented by exposure to the synchronizing jack contacts outside of the camera.

Figure 8:
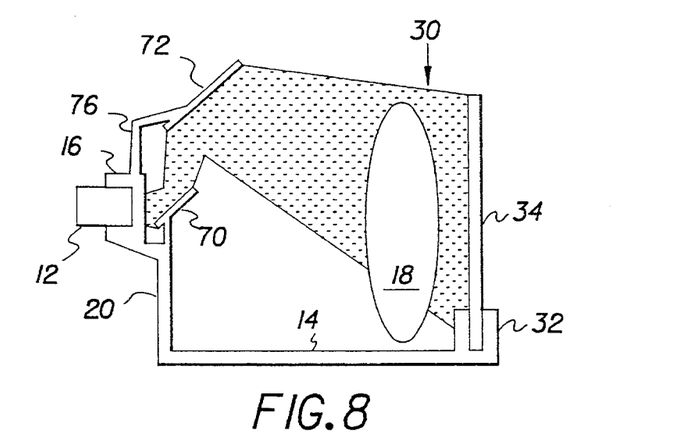
FIG. 8 is a simplified side schematic view of a second, alternative embodiment of the illumination arrangement of the invention.
Figure 9:
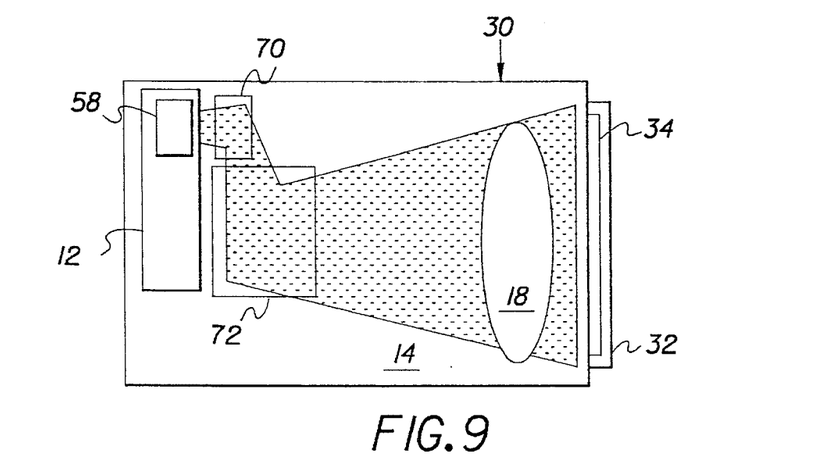
FIG. 9 is a simplified top schematic view of the second, alternative embodiment of the illumination arrangement of the invention.

A further embodiment is depicted schematically in the side and top views of FIGS. 8 and 9 wherein the camera flash unit 58 is employed to indirectly illuminate the combined scene 30. A pair of light reflectors 70 and 72 increases the separation angle between the camera flash unit source of illumination and the taking and close-up lenses 56 and 22, and centers and diffuses the illumination from above onto the combined scene 30.

In this embodiment, the camera support frame 20 suspends the first reflector 70 directly in front of the flash unit 58 to direct the flash light upward and over the center axis of the taking lens 56. The surface of this first reflector 70 preferably transfers the light with minimal loss and can have a slight concavity to reduce the spread of light. Because the light is traveling a farther distance than a straight path illumination, the concavity of reflector 70 keeps the light within the capture area or field of view of the camera taking lens 56 and close-up lens 22.

The second reflector 72, located above the taking lens 56 on an extension 76, directs the light forward and downward onto the combined scene 30. Separation between the taking lens 56 and the second reflector 72 should be great enough to prevent highlights. The surface of the second reflector 72 can be a dispersing, Lambertian surface to diffuse the light evenly and reduce shadows in the combined scene 30.

Figure 10:
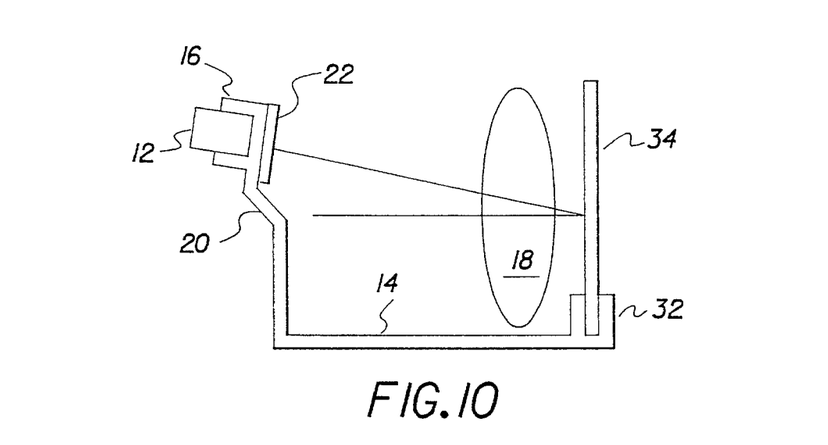
FIG. 10 is a simplified side schematic view of a third, alternative embodiment of the illumination arrangement of the invention.

In the simplest variation, depicted in the schematic side view of FIG. 10, the light from the camera flash unit 58 directly illuminates the combined scene 30 at a tilt angle provided by the camera support frame 20. In the camera support configuration and with the dimensions described above, the original camera position on camera support frame 20 was aligned perpendicular to the center of the scene print 34 held by the backdrop frame 32 as shown in FIGS. 5 and 6. Calculations show that about a 8.5 degree tilt will substantially remove the highlights. For the general range of dimensions of the play set referred to above, the camera receptacle 16 is raised about 4.5 inches (11.5 cm) and tilted downward at 8.5 degrees by extension 76. The resulting photographs are pleasing and exhibit no highlights. However, the photographs are at a slight angle changing the perspective of the playthings with respect to the scene print 34 in the combined scene 30.

It is proposed in the preferred embodiments described above that the close-up lens be included in the camera support frame so that insertion of the camera into the camera support frame aligns the close-up lens to the camera taking lens. In this way, a camera can be used to take photographs in the conventional manner as well as providing for framed, focused photographs when set into the camera support frame and operated as described above. Alignment of the camera taking lens to the close-up lens is critical to the application. Therefore, alignment features in the receptacle should be provided to optimize this alignment. In the above described embodiments, the camera receptacle is formed to wrap around the camera body or fit special camera features. Alternatively, the close-up lens may be set in a tube that fits into the recess that is typically formed around the camera lens. Using this method, alignment between the camera lens and close-up lens is optimized.

The invention has been described in a limited number of embodiments, but it will be understood that variations and modifications can be effected within the spirit and scope of the invention.

PARTS LIST FOR FIGS. 1–10 play set 10
camera 12
base 14
doll 15
receptacle 16
play area or stage 18
base slot 19
camera support frame 20
close-up, diopter lens 22
base runway 24
right and left side supports 26 and 28
side slots 27 and 29
combined scene 30
backdrop frame 32
back drop scene print 34
outward extending side tabs 35 and 37
pattern 36
"jig saw" cut out end 38
base tab 39
pair of holes 40
patterned receptacles 42 and 44
secondary flash unit battery compartment 46
secondary flash electronic charging circuit 48
secondary flash unit stand 50
secondary flash unit 52
support frame footprint 54
pins 55 and 57
camera taking lens 56
camera flash unit 58
baffle or shroud 60
photo detector 62
secondary flash unit cable 64
photo detector cable 66
first reflector 70
second reflector 72
mirror support extension 76
integral secondary flash unit extension 80

We claim:

1. A child's photographic play set for photographing playthings employing a camera having a taking lens and an exposure shutter releasable to make an exposure through the taking lens comprising:

a camera support frame having a shaped receptacle to hold a camera in a generally horizontal orientation above a horizontal surface;

a close-up lens attached to said camera support frame and aligned with the camera taking lens for adjusting the focus, depth of field and field of view;

a base adapted to extend on the horizontal surface away from said camera support frame and define a stage for the placement of playthings to be photographed; and a backdrop frame extending upward from said base for receiving a selected one of several different back drop scenes against which the playthings may be selectively arranged in a combined scene to be photographed in focus by said camera through said close-up lens.

2. The child's play set as recited in claim 1 wherein said camera includes an electronic flash unit activated on making an exposure with said exposure shutter, said play set further comprising:

means for inhibiting direct illumination of said combined scene by light emitted by said flash unit; and illumination source means disposed with respect to said base to illuminate said combined scene from a position out of alignment with the field of view of said camera.

3. The child's play set as recited in claim 1 wherein said camera includes an electronic flash unit activated on making an exposure with said exposure shutter, said play set further comprising:

a first reflective surface positioned by said camera support frame to direct illumination from said flash unit upward and over said taking lens as an illumination beam and, a second reflective surface having a diffusely and evenly reflecting surface positioned by said camera support frame to diffuse and disperse said illumination beam from said first reflective surface onto said combined scene.

4. The child's play set as recited in claim 1 wherein said camera includes an electronic flash unit activated on making an exposure with said exposure shutter, said play set further comprising:

a baffle disposed over said flash unit to block direct illumination of the combined scene by light emitted by said flash unit;

a triggerable, secondary illumination source disposed with respect to said base to illuminate said combined scene from a position out of alignment with the field of view of said camera; and sensing means for detecting the firing of the camera flash unit and triggering said secondary illumination source to illuminate said combined scene in synchrony with the release of said exposure shutter.

5. The child's play set as recited in claim 4 wherein:

said secondary illumination source comprises a secondary flash unit mounted to a flash stand positionable apart from said camera support frame and said backdrop frame sufficiently to provide illumination of said scene without reflecting light back to said camera taking lens, said secondary flash unit coupled to and triggerable by said sensing means.

6. The child's play set as recited in claim 5 wherein:

said sensing means comprises a photo detector mounted in said baffle for detecting flash illumination on firing of said camera flash unit for triggering said secondary flash unit to illuminate said combined scene in synchrony with manual release of said exposure shutter.

7. The child's play set as recited in claim 5 wherein:

said base is formed with positioning stations for fixedly positioning said secondary flash unit stand and said camera support frame at predetermined positions with respect to said stage and said backdrop frame for maintaining proper focus, field of view, and illumination of said combined scene.

8. The play set as recited in claim 1 wherein said camera is removably attachable to said camera support frame.

9. A child's photographic play set for photographing playthings employing a camera of the type having a taking lens, a flash unit activated on making an exposure and an exposure shutter releasable to make an exposure through the taking lens comprising:

a camera support frame configured with a receptacle for receiving said camera and aiming said camera taking lens and flash unit in a field of view, said support frame including a close-up lens supported and positioned by said frame in alignment with said camera taking lens, said camera taking lens and close-up lens establishing a combined focal length and depth of field;

a base extending from said camera support frame and having a backdrop member extending vertically into said field of view for presenting a background scene to be photographed in focus and having a play stage in the foreground of said background scene on which playthings may be arranged within said depth of field in a desired relation to said backdrop scene to present a combined scene to be photographed with said camera; and illuminating means disposed with respect to the camera flash unit to inhibit direct illumination of said combined scene by operation of said camera flash unit and to provide illumination of said combined scene at an angle and with an illumination intensity avoiding glare and wash out in the photograph taken with said camera.

10. The child's play set as recited in claim 9 wherein said backdrop member further comprises:

means for vertically supporting interchangeable backdrop images that may be selectively placed to change the background scene.

11. The child's play set as recited in claim 10, wherein said illuminating means further comprises:

means for inhibiting direct illumination of said combined scene by light emitted by said flash unit; and illumination source means disposed with respect to said base to illuminate said combined scene from a position out of alignment with the field of view of said camera.

12. The child's play set as recited in claim 11 wherein said illuminating means further comprises:

means responsive to release of said exposure shutter for operating said illumination source means in synchrony with operation of said shutter.

13. The child's play set as recited in claim 11 wherein said illuminating means further comprises:

sensing means disposed to detect the firing of the camera flash unit and to trigger the operation of said illumination source means to illuminate said combined scene in synchrony with the release of said exposure shutter.

14. The child's play set as recited in claim 10, wherein said illuminating means further comprises:

a baffle disposed over said camera flash unit to block direct illumination of the combined scene by light emitted by said flash unit;

a triggerable, secondary illumination source disposed with respect to said base to illuminate said combined scene from a position out of alignment with the field of view of said camera; and sensing means disposed to detect the firing of the camera flash unit and to trigger the secondary illumination source to illuminate said combined scene in synchrony with the release of said exposure shutter.

15. The child's play set as recited in claim 14 further comprising:

means for attaching said secondary illumination source to said base to assure correct positioning and orientation for illuminating said combined scene.

16. The child's play set as recited in claim 10, wherein said illuminating means further comprises:

a first reflective surface positioned by said camera support frame to direct said camera flash illumination upward and over said taking lens as an illumination beam and, a second reflective surface having a diffusely and evenly reflecting surface positioned by said camera support frame to diffuse and disperse said illumination beam from said first reflective surface onto said combined scene.

17. The child's play set as recited in claim 9, wherein said illuminating means further comprises:

means for inhibiting direct illumination of said combined scene by light emitted by said flash unit; and illumination source means disposed with respect to said base to illuminate said combined scene from a position out of alignment with the field of view of said camera.

18. The child's play set as recited in claim 17 wherein said illuminating means further comprises:

means responsive to the release of said exposure shutter for operating said illumination source means in synchrony with operation of said shutter.

19. The child's play set as recited in claim 17 wherein said illuminating means further comprises:

sensing means disposed to detect the firing of the camera flash unit and to trigger the operation of said illumination source means to illuminate said combined scene in synchrony with the release of said exposure shutter.

20. The child's play set as recited in claim 9, wherein said illuminating means further comprises:

a baffle disposed over said camera flash unit to block direct illumination of the combined scene by light emitted by said flash unit;

a triggerable, secondary illumination source disposed with respect to said base to illuminate said combined scene from a position out of alignment with the field of view of said camera; and sensing means disposed to detect the firing of the camera flash unit and to trigger the secondary illumination source to illuminate said combined scene in synchrony with the release of said exposure shutter.

21. The child's play set as recited in claim 20 further comprising:

means for attaching said secondary illumination source to said base to assure correct positioning and orientation for illuminating said combined scene.

22. The child's play set as recited in claim 9, wherein said illuminating means further comprises:

a first reflective surface positioned by said camera support frame to direct said camera flash illumination upward and over said taking lens as an illumination beam;

a second reflective surface having a diffusely and evenly reflecting surface positioned by said camera support frame to diffuse and disperse said illumination beam from said first reflective surface onto said combined scene.

23. A child's play set as recited in claim 9, wherein said camera is releasably attachable to said camera support frame.

24. A child's photographic play set adapted to be placed on a horizontal surface for photographing playthings employing a removable camera of the type having a taking lens, a flash unit activated on making an exposure and an exposure shutter releasable to make an exposure through the taking lens comprising:

a camera support frame extending upward from a horizontal surface configured with a receptacle raised above said surface for receiving said camera and aiming said camera taking lens and flash unit in a field of view generally downward toward said horizontal surface and away from said support frame, said support frame including a close-up lens supported and positioned by said frame in alignment with said camera taking lens, said camera taking lens and close-up lens establishing a combined focal length and depth of field; and an elongated base adapted to rest on said horizontal surface, said base extending away from said camera support frame and having a backdrop member extending vertically from said base into said field of view for presenting a background scene to be photographed in focus, said base further having a play stage in the foreground of said background scene on which playthings may be arranged within said depth of field in a desired relation to said backdrop scene to present a combined scene to be photographed with said camera and illuminated by downward illumination from said camera flash unit onto said combined scene at an angle and with an illumination intensity avoiding glare and wash out in the photograph taken with said camera.

25. The child's play set as recited in claim 24 wherein said backdrop member further comprises:

means for vertically supporting interchangeable backdrop images that may be selectively placed to change the background scene.

* * * * *